United States Patent [19]
Bremer, Jr. et al.

[11] 4,008,600
[45] Feb. 22, 1977

[54] TORSIONAL VIBRATION DAMPER MEASURING

[75] Inventors: Robert Charles Bremer, Jr., Brownsburg; Hans Otto Haupt, Indianapolis, both of Ind.

[73] Assignee: Wallace-Murray Corporation, New York, N.Y.

[22] Filed: Mar. 31, 1976

[21] Appl. No.: 672,278

Related U.S. Application Data

[63] Continuation-in-part of Ser. No. 622,533, Oct. 15, 1975, abandoned.

[52] U.S. Cl. .................................... 73/11; 73/70.1
[51] Int. Cl.² ........................................ G01M 13/00
[58] Field of Search ........... 73/11, 70.1, 71.1, 71.3, 73/1 DV

[56] References Cited
UNITED STATES PATENTS

| | | | |
|---|---|---|---|
| 3,054,284 | 9/1962 | Ciringione et al. | 73/70.1 X |
| 3,693,402 | 9/1972 | Jones | 73/11 |
| 3,901,072 | 8/1975 | Vasiliev et al. | 73/70.1 |

*Primary Examiner*—James J. Gill
*Attorney, Agent, or Firm*—Thomas J. Greer, Jr.

[57] ABSTRACT

An apparatus and method for determining the response and performance of a torsional vibration damper. Normally aligned optical patterns are placed on an axial face of the hub and on an axial face of the inertia member. Light is projected on and reflected from both the pattern on the hub and the pattern on the inertia member. Displacement of the hub and inertia member and the phase relationship between the displacements is sensed during rotation by reflected light passed to two photocells. The performance of the damper, including its dynamic response, is computed by comparing the outputs of the two photocells and may be read by meters.

8 Claims, 4 Drawing Figures

TORSIONAL VIBRATION DAMPER MEASURING

This is a continuation-in-part application of Ser. No. 622,533, filed Oct. 15, 1975, now abandoned.

This invention relates to a device for measuring torsional vibrations of a rotating shaft and more particularly to a device for measuring the performance of a torsional vibrational damper.

Many types of rotating machinery are subject to torsional vibrations. This is especially true of internal combustion engines wherein each cylinder contributes a discrete force (impulse) of short duration, thereby causing the crankshaft to rotate. There is accordingly a discontinuous application of force to the crankshaft and this, coupled with the mass and elasticity of the metal crankshaft, gives rise to torsional vibrations. Such vibrations may be considered as small amplitude back and forth twistings of the crankshaft, superimposed upon the main, unidirectional rotation of the crankshaft. Unless controlled, torsional vibrations may attain relatively high amplitudes and lead to fatigue failure of the crankshaft, as well as various related problems in accessories driven by the crankshaft. This crankshaft behavior has long been known to workers in the automotive art and a great number of constructions have evolved for damping torsional vibrations. Many torsional vibration dampers are presently classified in the United States Patent Office in Class 74, Sub-class 574.

A common form of torsional vibration damper is defined by a hub member adapted to be attached to the end of an engine crankshaft. The hub carries an inertia member, the hub and inertia members usually coupled by elastomer or partially abutting frictional material. In a great number of torsional vibration dampers, the theory of operation is that the energy which causes the torsional vibrations is converted into heat in either the frictional material or the elastomer. Thus, less energy is available to cause relatively high vibrational amplitudes than without the damper.

In the fabrication and design of torsional vibration dampers, it is often desirable to determine damper efficiency and damper performance, the efficiency and performance being to what degree vibration is controlled or altered and the frequency response of the damper itself, respectively. A number of constructions are known which measure the torsional vibrations of a rotating shaft. Examples are afforded by, but not necessarily limited to, the following U.S. Pat Nos.: Chilton, 1,568,544; Summers, 1,571,359; Schrater, 2,193,079; Dashefsky, 2,219,298; Zmuda, 2,491,240; Ciringione, 3,054,284; and Collette, 3,195,381.

According to the present invention, the efficiency and performance of a torsional vibration damper are measured by sensing the motion of the hub member (rigidly coupled to the rotating crankshaft) and by simultaneously sensing the motion of the inertia member. These sensed motions are compared and the efficiency and performance calculated. In general, damper performance and efficiency include such parameters as the ratio of magnitudes of the inertia ring torsional vibration to the hub torsional vibration, at a given frequency; the characteristic of the phase relationship between the inertia ring and the hub at a given frequency; the ratio of the torsional vibration energy absorbed by the damper in a torsional system to the torsional vibration energy generated by the same system or in general the effect the damper has on the torsional system. The manner of sensing the motions is carried out by optical means. In general, it is known to optically sense the motion of a rotating member. Such optical sensing is illustrated by, but not necessarily limited to, the following U.S. Pat. Nos.: Aronoff, 1,878,658; Johnson, 3,146,432; Woods, 3,323,051; Gardner, 3,706,494. In the practice of the present invention, the optical sensing is facilitated by a decalcomania placed upon one face of the damper. The decalcomania includes radial bands or sectors of alternating black and white, the sectors on both the hub member and the inertia member being initially angularly aligned. However, under the influence of torsional vibrations, the angular alignment changes as a result of the difference in vibration amplitude and general lagging phase relationship of the inertia ring relative to the hub inherent in a damped spring-mass system. This change is measured to make the calculations of performance. The calculations are carried out continuously by an electronic system. Various parameters available in real time from the system include hub amplitude, amplitude and phase of the inertia mass relative to the hub, elastomer stress, engine rpm and various other derived parameters.

IN THE DRAWINGS

Figure 2:
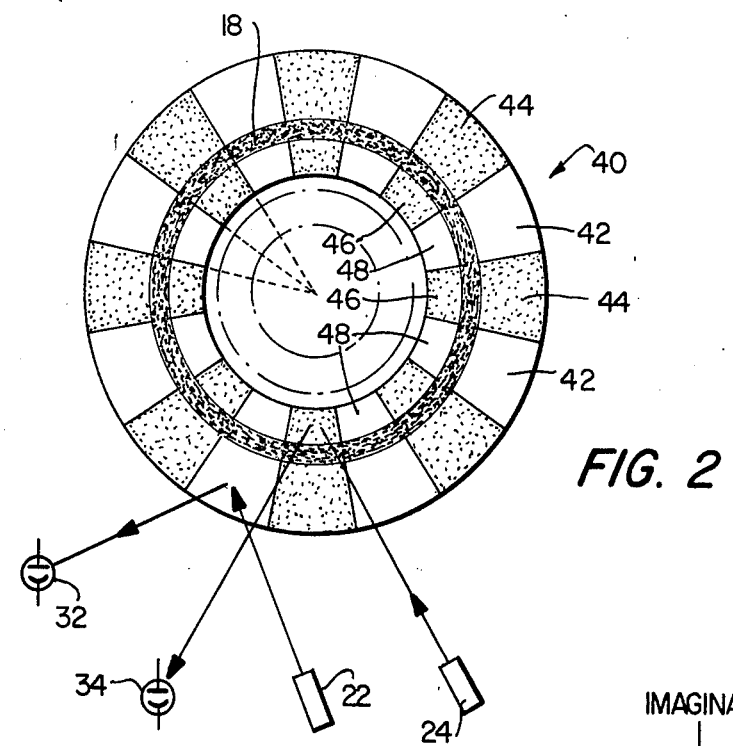
FIG. 2 is a view taken along section 2—2 of FIG. 1, with some elements schematically shown.
Figure 1:
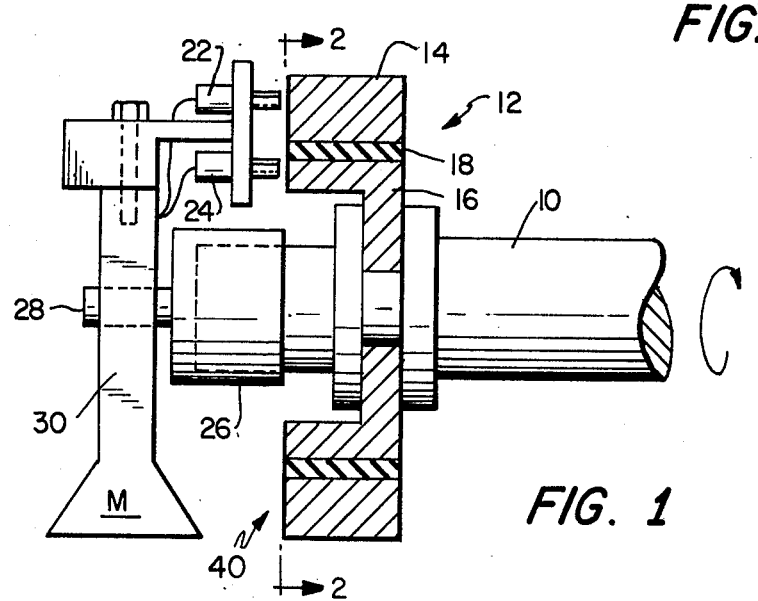
FIG. 1 is an elevational view of an optical sensor of this invention positioned at the end of a shaft carrying a torsional vibration damper.

Referring now to FIGS. 1 and 2 of the drawings, the numeral 10 denotes an end of a rotating shaft subject to torsional vibration. The shaft 10 may be for example the crankshaft of an internal combustion engine. The numeral 12 denotes a torsional vibration damper of known construction and typically includes an outer inertia member 14 and an inner hub member 16, the latter rigidly coupled to shaft 10. The inertia and hub members are coupled by an elastomer band 18.

The numeral 22 denotes a source of illumination and includes a length of an internally reflecting fiber optic bundle for projecting light on the left face of inertia member 14. Numeral 24 represents a source of illumination similar in construction to source 22, the former projecting light on the left face of hub 16. The numeral 26 denotes a cap on an end portion of shaft 10 and carries a pintle bearing element 28, the member 28 extending through an arm 30 whose lower end carries a mass M. The arrangement of parts shown in FIG. 1 is such that as shaft 10 rotates and also executes torsional vibrations, the hub member 16 rotates in exactly the same manner. Members 26 and 28 also rotate with shaft 10. By virtue of anti-friction elements (not illustrated) associated with pintle 28, the arm 30 remains in a substantially vertical position during shaft rotation. Accordingly, the light projection elements 22 and 24 do not significantly rotate with rotation of shaft 10.

The action of a vibration damper such as illustrated is known. Torsional vibrations of the shaft transmitted to hub 16 are not faithfully transmitted to inertia member 14. The reason is that elastomer 18 does not define a rigid connection between the hub and inertia member and accordingly there is a lag or phase difference between the angular motion of inertia member 14 and that of hub 16. This difference in angular motion between the hub and the inertia member causes the elastomer to flex and ideally convert the torsional vibrational energy into heat within the elastomer material 18. That is to say, the radially innermost face of elastomer band or annulus 18 follows the torsional vibration of shaft 10, while the radially outermost annular face of the elastomer also twists back and forth, but lags because of the inertia of member 14.

A manner of measuring the phase difference between the hub and the inertia member will now be given by reference to FIG. 2. The numeral 40 denotes a circular decalcomania consisting of alternating black and white bands or sectors on one side thereof. The decalcomania 40 is adhesively applied to the left face (see FIG. 1) of damper 12. If there is a central recess in the damper, such as illustrated, the central portion of the decalcomania may be removed by cutting with a knife. By means of a knife or other suitable instrument the portion of the decalcomania which overlies the left edge of elastomer band 18 is removed. The result is a series of truncated, alternating black and white sectors around the left face of the damper. The sectors are radially separated by the radial width of elastomer 18. The white sectors attached to the inertia member are denoted by the numeral 42, while the white sectors attached to the hub are denoted by the numeral 48. The dark sectors attached to the inertia member are denoted by the numeral 44, while the dark sectors attached to the hub are denoted by the numeral 46. The dashed lines at the left and center of FIG. 2 illustrate the decalcomania prior to removal of its central position. The decalcomania may be formed from paper or cardboard or the like, the paper carrying an adhesive on one face to facilitate attachment to damper 12.

As shown at FIG. 1 and as schematically indicated in FIG. 2, the fiber optic bundle in source 22 projects light onto the left face of inertia member 14 at the center of a white segment, this reflected light being directed into a photocell schematically denoted by the numeral 32. The photocell is also carried by arm 30. Similarly, the light emitted from the fiber optic bundle in illumination source 24 projects onto the left face of hub 16 at the center of a black segment and is reflected into a photocell 34. As the damper rotates the two light beams will strike different regions, but the relative phase of the incident and reflected light will be the same if there are no torsional vibrations. Photocells 32 and 34 are suitably connected to amplifiers. In practice, the transmitted and reflected light for each of two optical paths is intermingled within a single fiber optic bundle. Thus, the fiber optic bundle of source 22 both projects and receives light, as does the bundle in source 24. The light reflected from the left face of hub 16 and inertia member 14 is converted in known manner into electrical signals by the photocells. Thus, when light is reflected from a white sector, the electrical output of the associated photocell will be relatively high (assuming a photovoltaic photocell). When light is reflected from a dark sector, the photocell output will be relatively low. Due to the different points of incidence between the two projected and reflected light beams, a phase shift of approximately 90° between the outputs of the two photocells is generated, and is independent of the rotational frequency.

The reader will now be in a position to recognize that if shaft 10 underwent no torsional vibration during its rotation, electrical signals generated by the two photocells would be 90° out of phase and of the same magnitude. However, in the presence of torsional vibration, the white sectors 42 and 48 will be at times out of their original angular alignment during rotation of shaft 10, as will dark sectors 44 and 46. This angular misalignment will cause the phase ratio of the electrical signals from the two photocells to change. Such change is detected and processed by an electrical circuit, to be described, to yield various dynamic performance parameters relative to the vibration.

If there is torsional vibration, the processed signals proportional to light reflected to the photocells will be periodic, and will vary in phase relative to each other proportional to the relative vibration of each member. In other words, the signals will be periodic but phase modulated, with the vibration amplitudes proportional to the amount of phase modulation. In addition, since the vibration damper is a dynamic system operating often near resonance, modulation will differ between these signals. A general shift in phase for each overall period of a given frequency will be present. The frequencies present in each signal will be the same.

Figure 3:
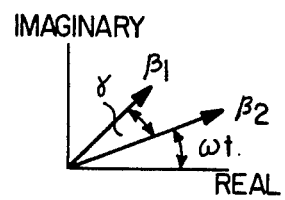
FIG. 3 is a vectorial representation of the torsional vibration of each of the hub and inertia members.

Reference to FIG. 3 illustrates one aspect of the behavior of the hub and inertia member rotating masses. The real component of vector $\beta_1$ represents the vibration of the hub relative to a circuit established reference. The real component of vector $\beta_2$ represents the vibration of the inertia member relative to the same reference. The two vibrations are out of phase by an angle gamma and differ in magnitude by a factor M, where M is the ratio of magnitudes of the inertia ring torsional vibration to the hub torsional vibration, at a given frequency.

Figure 4:
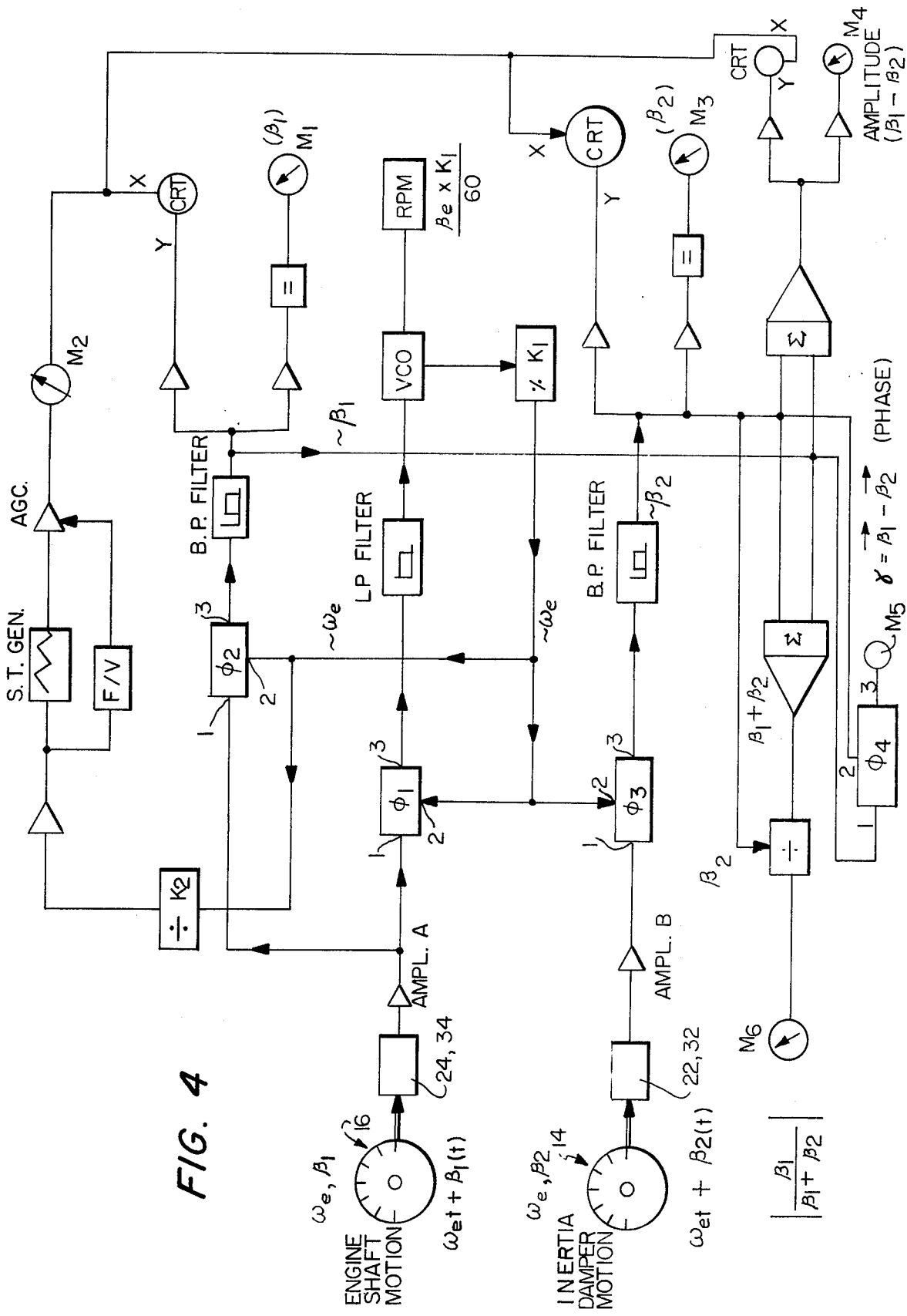
FIG. 4 is a partially schematic view of an electro-optical system for continuously displaying damper performance by generating and processing certain electrical signals derived from the optical sensing of damper motion.

Referring now to FIG. 4 of the drawings, an electrical system is schematically indicated for processing the photocell outputs to measure damper efficiency and performance. In FIG. 4, the numeral 16 indicates the hub of FIG. 1, while the numeral 14 indicates the corresponding inertia member. The illumination source 22 and the photocell associated with the hub are denoted by a box labeled 24, 34. The corresponding illumination source and photocell associated with the inertia member is denoted by a box labeled 22, 32. The unidirectional angular velocity of shaft 10 is denoted by $\omega_e$, a typical value of which may represent an engine speed of 2100 rpm. The instantaneous angular displacement from the position defined only by $\omega_e$ and time ($t$) of hub 16 due to torsional vibrations in the crankshaft 10 is denoted by $\beta_1(t)$. Similarly, the instantaneous angular displacement from the position defined only by $\omega_e$ and $t$ of inertia member 14 due to torsional vibrations in the crankshaft 10 is denoted by $\beta_2(t)$. Both such angular displacements will be alternately in the same or in opposite directions with respect to the direction of rotation of the crankshaft at various times during engine operation. The instantaneous angular position of hub 16 as well as crankshaft 10 is denoted by $\omega_e t + \beta_1(t)$, where $\omega_e$ is the instantaneous unidirectional angular velocity of the hub and therefore $\omega_e t$ is the instantaneous position of the hub not considering vibration. Thus, the information received by amplifier A corresponds to $\omega_e t = \beta_1(t)$. This information is fed to a first phase feedback loop $\phi_1$. The box denoted $\phi_1$ is a phase feedback reference loop, known in the art. It has two input terminals denoted respectively by 1 and 2, and an output terminal denoted by 3. Such a loop is described at, for example, page 355 of Reference Data For Radio Engineers, 1956, 4th Edition, published by International Telephone and Telegraph Co., the entire book being hereby incorporated by reference. The output of $\phi_1$ is fed to a low pass filter and to a voltage controlled oscillator denoted by VCO. Then it passes to a divider denoted by $K_1$ which generates an electrical signal corresponding to $\omega_e$ but without the torsional vibration component $\beta_1(t)$. A digital revolutions per minute indicator, denoted by RPM in FIG. 3, will show $$\frac{\omega_e \times K_1}{60}.$$

The signal from amplifier A is also fed into another phase comparator denoted by the box $\phi_2$ of construction similar to $\phi_1$, with a signal corresponding to $\omega_e$ impressed on its second input terminal. The output of $\phi_2$ passes to a band pass filter or real time analyzer (a real time analyzer is analysis instrumentation designed to determine the magnitude of frequency components of a broad signal at the instant that the signal is being generated) or a variable frequency filter whose output corresponds to $\beta_1(t)$. The peak value thereof is indicated by meter $M_1$. The signal from the band pass filter coupled to $\phi_2$ is also amplified and fed to the Y axis terminal of a cathode ray tube denoted by CRT at the upper right-hand portion of FIG. 3. The time base of X axis of this CRT is derived from the signal corresponding to $\omega_e$ which is fed to divider $K_2$ and its associated amplifier. A sawtooth generator (S.T. GEN.) and frequency to voltage controller (F/V) feeds the automatic gain control (AGC). Here, the signal passes into meter $M_2$ and thence to the X axis terminal of the CRT.

The signal fed to the input of amplifier B corresponds to $\omega_e t$ and $\beta_2(t)$ where $\beta_2(t)$, as noted, corresponds to the instantaneous angular displacement of inertia member 14 from a position defined by $\omega_e t$. The signal corresponding to $\omega_e$ from divider $K_1$ is also fed into the second input terminal of a phase discriminator loop denoted by $\phi_3$ (of construction similar to that of $\phi_1$ and $\phi_2$) and the output of $\phi_3$ fed to a second band pass filter or real time analyzer or a variable filter, the output of the latter corresponding to $\beta_2(t)$. This is also amplified as indicated and fed to a cathode ray tube CRT and meter $M_3$.

The amplitude difference between $\beta_1(t)$ and $\beta_2(t)$ appears in the lower right summing amplifier $\epsilon$. The signals $\beta_1(t)$ and $\beta_2(t)$ are at the same time led to phase discriminator $\phi_4$ which determines in its output the phase difference of the two input signals $\beta_1(t)$ and $\beta_2(t)$. The discriminator $\phi_4$ is of the same construction as $\phi_1$. The reader will now be in a position to note that one function of the system shown at FIG. 4 is to eliminate the effect of the unidirectional shaft rotational speed on the signals which are processed and utilized for display of damper performance. Thus, the system obtains $\beta_1(t)$ and $\beta_2(t)$ substantially independent of speed. One performance parameter of the damper 12 can be denoted by $\eta$ and is equal to the magnitude of $$\frac{\beta_1(t)}{\beta_1(t) + \beta_2(t)}.$$

The meter $M_6$ at the lower left of FIG. 3 indicates this parameter and is fed from the indicated divider which performs the division.

The reader will note that a single source of illumination may be employed in lieu of the separate sources 22, 24. It will also be apparent that the bands 42, 44 and 46, 48 may alternate in magnetic qualities, radioactive qualities, etc., instead of alternating in optical absorption of light, provided a suitable change is made in the sensors 32, 34. Calibration may be carried out by known methods. For example, calibration can be achieved by shifting the fiber optic device 22 or 24 in an angular direction a certain amount so as to measure a specific displacement in terms of the width of one of the sectors. The amount of shift would have to be limited so as to measure a distance equal to or less than equivalent to one-half of one of the black sectors. The system may also be calibrated by removing 22 and 24 from 30 and placing them in a fixture for measuring the system response to a calibration disc where the width of the sectors 42-48 thereon is made to yield a synthetic calibration signal. The disc rotating without vibration will synthesize magnitude signals and phase shift by the nature of its uneven and offset sectors.

The signals corresponding to $\beta_1(t)$ and $\beta_2(t)$ may be suitably processed to yield any desired performance parameter of the damper, such as its dynamic characteristics or transfer function. For example, referring to FIG. 3., the several meters $M_1 - M_6$ show the parameters indicated. The system of FIG. 3 permits measurement of several performance parameters of a torsional vibration damper no matter how fast the engine is turning. The frequency of the torsional vibrations will normally be higher than the rotation frequency of the shaft, a fact utilized by the system of FIG. 3. Further, the system effectively generates a smooth signal corresponding to engine speed if the engine speed is rapidly changing. Additionally, prior art systems employing teeth on the periphery of rotating disc or hub elements have often employed, typically, sixty teeth. The number of black and white sectors employed with the present invention is much smaller and hence measurement of higher torsional vibration amplitudes is usually possible.

What is claimed is:
1. A method of measuring the performance of a rotating torsional vibration damper, the damper being of the type having a hub adapted to be coupled to a rotating shaft, the shaft subject to torsional vibrations while rotating, the hub carrying an annular inertia member, whereby the inertia member torsionally vibrates out of phase with the torsional vibrations of the hub, the method characterized by,
   a. providing means carried by a surface portion of said hub member for varying the intensity of light reflected therefrom upon rotation of the hub,
   b. providing means carried by a surface portion of said inertia member for varying the intensity of light reflected therefrom upon rotation of the inertia member,
   c. illuminating each of said hub and inertia member means and then sensing the light reflected therefrom,
   d. converting said sensed, reflected light from said hub means into a first electrical signal and converting said sensed, reflected light from said inertia member means into a second electrical signal, e. comparing said electrical signals, to thereby measure damper performance.

2. A method of measuring the performance of a rotating torsional vibration damper, the damper being of the type having a hub adapted to be coupled to a rotating shaft, the shaft subject to torsional vibrations while rotating, the hub carrying an annular inertia member, whereby the inertia member torsionally vibrates out of phase with torsional vibrations of the hub, the method characterized by,
 a. obtaining the angular vibratory motion of said hub member independent of the speed of the rotating shaft and converting such vibratory motion into a first signal,
 b. obtaining the angular vibration motion of said inertia member independent of the speed of the rotating shaft and converting such vibratory motion into a second signal,
 c. comparing said first and second signals, to thereby measure damper performance.

3. A system of measuring the performance of a torsional vibration damper, the damper being of the type having a hub adapted to be coupled to a rotating shaft, the shaft subject to torsional vibrations while rotating, the hub carrying an annular inertia member, whereby the inertia member torsionally vibrates out of phase with the torsional vibration of the hub, the system including,
 a. means carried by a surface portion of said hub member for varying the intensity of light reflected therefrom as the hub rotates,
 b. means carried by a surface portion of said inertia member for varying the intensity of light reflected therefrom as the inertia member rotates,
 c. means for illuminating said hub and inertia members and means for sensing light reflected from each member,
 d. means for converting said sensed, reflected light into first and second signals,
 e. means for comparing said signals, to thereby measure damper performance.

4. The system of claim 3 wherein both said (a) and (b) means are defined by alternate black and white sectors.

5. The system of claim 4 wherein said sectors are located on an end face of said damper.

6. A system for measuring the performance of a torsional vibration damper, the damper being of the type having a hub adapted to be coupled to a rotating shaft, the shaft subject to torsional vibrations while rotating, the hub carrying an annular inertia member, whereby the inertia member torsionally vibrates out of phase with the torsional vibrations of the hub, the system including,
 a. means for measuring the angular vibratory motion of said hub member independent of the speed of the rotating shaft and converting such vibratory motion into a first signal,
 b. means for measuring the angular vibratory motion of said inertia member independent of the speed of the rotating shaft and converting such vibratory motion into a second signal,
 c. means for comparing said first and second signals, to thereby measure damper performance.

7. The system of claim 6 wherein said (c) means includes a cathode ray tube for yielding a visual display of damper performance.

8. A method of measuring the performance of a rotating torsional vibration damper, the damper being of the type having a hub adapted to be coupled to a rotating shaft, the shaft subject to torsional vibrations while rotating, the hub carrying an annular inertia member, whereby the inertia member torsionally vibrates out of phase with the torsional vibrations of the hub, the method characterized by,
 a. measuring the entire angular motion of said hub and converting such motion into a first signal,
 b. measuring the entire angular motion of said inertia member and converting such motion into a second signal,
 c. processing said first and second signals to substantially remove portions thereof corresponding to unidirectional rotary motion of the shaft, whereby first and second signals corresponding to torsional vibrations alone are obtained,
 d. comparing said first and second processed signals, to thereby measure damper performance.

* * * * *